United States Patent
Dufay et al.

(10) Patent No.: US 12,157,558 B2
(45) Date of Patent: Dec. 3, 2024

(54) UPLOCK PROVIDED WITH RETENTION DETECTION MEANS

(71) Applicant: SAFRAN LANDING SYSTEMS, Velizy Villacoublay (FR)

(72) Inventors: Ludovic Dufay, Moissy-Cramayel (FR); Michel Arbentz, Moissy-Cramayel (FR); Vincent Pascal, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 17/769,623

(22) PCT Filed: Oct. 15, 2020

(86) PCT No.: PCT/EP2020/079133
§ 371 (c)(1),
(2) Date: Apr. 15, 2022

(87) PCT Pub. No.: WO2021/074347
PCT Pub. Date: Apr. 22, 2021

(65) Prior Publication Data
US 2024/0132204 A1    Apr. 25, 2024
US 2024/0228024 A9    Jul. 11, 2024

(30) Foreign Application Priority Data
Oct. 17, 2019 (FR) ...................... 1911643

(51) Int. Cl.
*B64C 25/26* (2006.01)
*E05B 81/68* (2014.01)
*E05B 81/70* (2014.01)

(52) U.S. Cl.
CPC .............. *B64C 25/26* (2013.01); *E05B 81/68* (2013.01); *E05B 81/70* (2013.01)

(58) Field of Classification Search
CPC .......... B64C 25/26; B64C 25/28; E05B 81/68
See application file for complete search history.

(56) References Cited

U.S. PATENT DOCUMENTS 4,497,462 A * 2/1985 Hamatani ............. B64C 1/1415
 244/129.5
5,257,840 A * 11/1993 Rouzaud ................... E05C 3/24
 292/201

(Continued)

FOREIGN PATENT DOCUMENTS

EP      1 342 664 A1    9/2003
WO   2018/189299 A1   10/2018

OTHER PUBLICATIONS

International Search Report for PCT/EP2020/079133 dated Jan. 20, 2021 [PCT/ISA/210].

(Continued)

*Primary Examiner* — Nicholas McFall
(74) *Attorney, Agent, or Firm* — Sughrue Mion, PLLC

(57) ABSTRACT

An uplock for retaining a capture pin of a movable part includes a hook that is movable between a release position and a retaining position, a locking part that interacts with the hook and is movable between a locking position and an unlocking position, and a detector. The detector includes a first sensor for detecting whether the hook is in the retaining position, and a second sensor for detecting a presence of the mobile part in the immediate vicinity of the uplock in the position occupied by the mobile part when the capture pin is in the hook.

20 Claims, 4 Drawing Sheets

(56) References Cited

U.S. PATENT DOCUMENTS

2014/0252210 A1* 9/2014 Schmidt ................ G01K 11/32
                                                    250/208.2
2020/0269973 A1* 8/2020 McCambridge ........ B64C 25/28

OTHER PUBLICATIONS

Written Opinion for PCT/EP2020/079133 dated Jan. 20, 2021 [PCT/ISA/237].

* cited by examiner

UPLOCK PROVIDED WITH RETENTION DETECTION MEANS

CROSS REFERENCE TO RELATED APPLICATIONS

This application is a National Stage of International Application No. PCT/EP2020/079133 filed Oct. 15, 2020, claiming priority based on French Patent Application No. 19 11643 filed Oct. 17, 2019, the entire contents of each of which being herein incorporated by reference in their entireties.

BACKGROUND OF THE INVENTION

The invention relates to an uplock such as those used in aircraft for retaining landing gear of the aircraft in the retracted position or for retaining cargo hold doors, and more generally for retaining any movable element of the aircraft in one of its positions.

In a manner which is known per se, an uplock of this type comprises a hook which is pivotally mounted on the uplock between a retaining position and a release position, and a member for locking the hook which is urged into a position for locking the hook when the latter is brought into the retaining position, and which is pushed back towards an unlocked position by an unlocking actuator in order to enable the hook to swing towards the release position and thus release the movable element.

The hook co-operates with a capture pin of the movable element which, when the element arrives at the position in which it is to be retained, pushes the hook into the retaining position in which the hook is automatically locked by the locking member. The capture pin of the movable element is then trapped in the hook and cannot be released therefrom. To enable the movable element to be released, the locking member has to be pushed back into the unlocked position, for example by means of an unlocking actuator. The movable element is then free to leave the position in which it was retained; the capture pin drives the hook from the retaining position towards the release position.

The uplock is usually provided with a proximity sensor to detect the position of the locking member. To this end, the locking member is equipped with a target which is movable between a position that is remote from the proximity sensor and a position that is proximate to the proximity sensor, each position of the target being associated with one of the positions of the locking member, so that the electrical signal generated by the proximity sensor changes when the locking member passes from the unlocked position to the locked position and vice versa. Detecting the locking member in the locked position means that the capture pin has pushed the hook into the retaining position in which it is automatically locked, so that this detection also corresponds to an indirect detection of retention of the movable element.

However, on occasion, the hook has been correctly detected in its retaining position, but in fact the capture pin has not been retained by the hook because part of the hook has broken, preventing it from retaining the capture pin. Under these exceptional circumstances, detection of the hook in the retaining position does not guarantee that the movable element has in fact been retained.

The document WO 2018/189299 proposes providing the casing with a second proximity sensor to detect whether the capture pin is in fact present in the hook when the latter is in its retaining position. To this end, a second target is carried by an indicator lever which is pushed back by the capture pin itself and which places the second target in a position remote from the sensor if the capture pin is not in the hook and in a position proximate to the second sensor if the capture pin is in the hook in the retaining position. Thus, the movable element will be considered to be effectively retained if the first sensor indicates that the locking member is in the locked position and if the second sensor indicates that the capture pin is in fact present in the hook. However, disposition of an indicator lever so as to cooperate with the capture pin may prove to be difficult given the bulky presence of the hook, which masks a large proportion of the capture pin when the movable element is held in position.

Objective of the Invention

The objective of the invention is to propose an uplock which enables simple detection of the hook in the retaining position and the capture pin present in the hook.

SUMMARY OF THE INVENTION

In order to achieve this objective, an uplock for selectively retaining a capture pin of a movable element is proposed, the uplock comprising:
- a hook which is movable between a release position and a position for retaining a capture pin of the movable element;
- a locking member interacting with the hook and movable between a locked position in which it immobilizes the hook in the retaining position and an unlocked position in which the hook is free to be displaced under the force of the capture pin of the movable element;
- detection means adapted to detect a situation in which the hook is in the retaining position and whether the capture pin is present in the hook.

In accordance with the invention, the detection means comprise a first sensor which cooperates with the hook or the locking member in order to detect whether the hook is in the retaining position, and a second sensor which is disposed to cooperate with a portion of the movable element which is distinct from the capture pin in order to detect the presence of the movable element in the immediate proximity of the uplock in the position occupied by the movable element when the capture pin is present in the hook.

Thus, the second sensor is used to confirm that, when the hook is in its retaining position, the movable element is in fact in the position which it is supposed to occupy when the capture pin is present in the hook, without detecting the presence of the capture pin itself in the hook. Thus, simple digital processing of the signals from the two sensors means that it is easy to verify that the hook is in fact in the retaining position AND that the movable element is in fact in the position which it is supposed to occupy when the capture pin is retained by the hook.

In accordance with a first particular embodiment of the invention, the second sensor is adapted to directly detect the presence of the movable element in the immediate proximity of the uplock in the position occupied by the movable element when the capture pin is present in the hook.

The term "directly" is used to mean that this detection is carried out without a movable intermediate part operated by the moving element. This disposition therefore does not require any additional movable parts on the uplock. It suffices to install a target on the movable element adapted to cooperate with the second sensor in order to cause the signal from it to change when the target is in the immediate proximity of the second sensor, or to use a second sensor which is sensitive to the mere presence of the movable element in the immediate proximity of the sensor, such as a microswitch or an optical sensor, so that the movable element constitutes the target for the sensor.

Thus, preferably, the second sensor is a proximity sensor, with the portion of the movable element that cooperates with the second sensor forming a target.

In accordance with a second particular embodiment of the invention, the second sensor cooperates indirectly with the portion of the movable element via an indicator lever which is movably mounted on the uplock, the portion of the movable element displacing the lever between a position in which the indicator lever is proximate to the second sensor and a position in which the indicator lever is remote from the second sensor, one of said positions corresponding to the presence of the movable element in the immediate proximity of the uplock in the position occupied by the movable element when the capture pin is present in the hook.

In this embodiment, the detection is indirect, but it is still intended to detect the presence of the movable element in the immediate proximity of the uplock in the position occupied by the movable element when the capture pin is present in the hook without cooperating directly with the capture pin.

Thus, preferably, the second sensor is a proximity sensor, with the portion of the movable element that cooperates with the second sensor forming a target.

Advantageously, at least one of the sensors is mounted on a fixed portion.

The invention also provides a landing gear assembly comprising an element which is movable between a lowered position and a raised position in which a capture pin which is secured to the movable element is received in the hook of an uplock in accordance with the invention, the second sensor being positioned so as to extend in the proximity of a portion which is integral with the movable element and is distinct from the capture pin in order to detect the presence of the movable element in the immediate proximity of the uplock.

In accordance with two embodiments: the movable element is landing gear and the movable element is a cargo hold door.

BRIEF DESCRIPTION OF THE DRAWINGS

The invention will be better understood in the light of the following detailed description of a particular embodiment of the invention, given with reference to the accompanying drawings, in which.

DETAILED DESCRIPTION OF THE INVENTION

Figure 1:
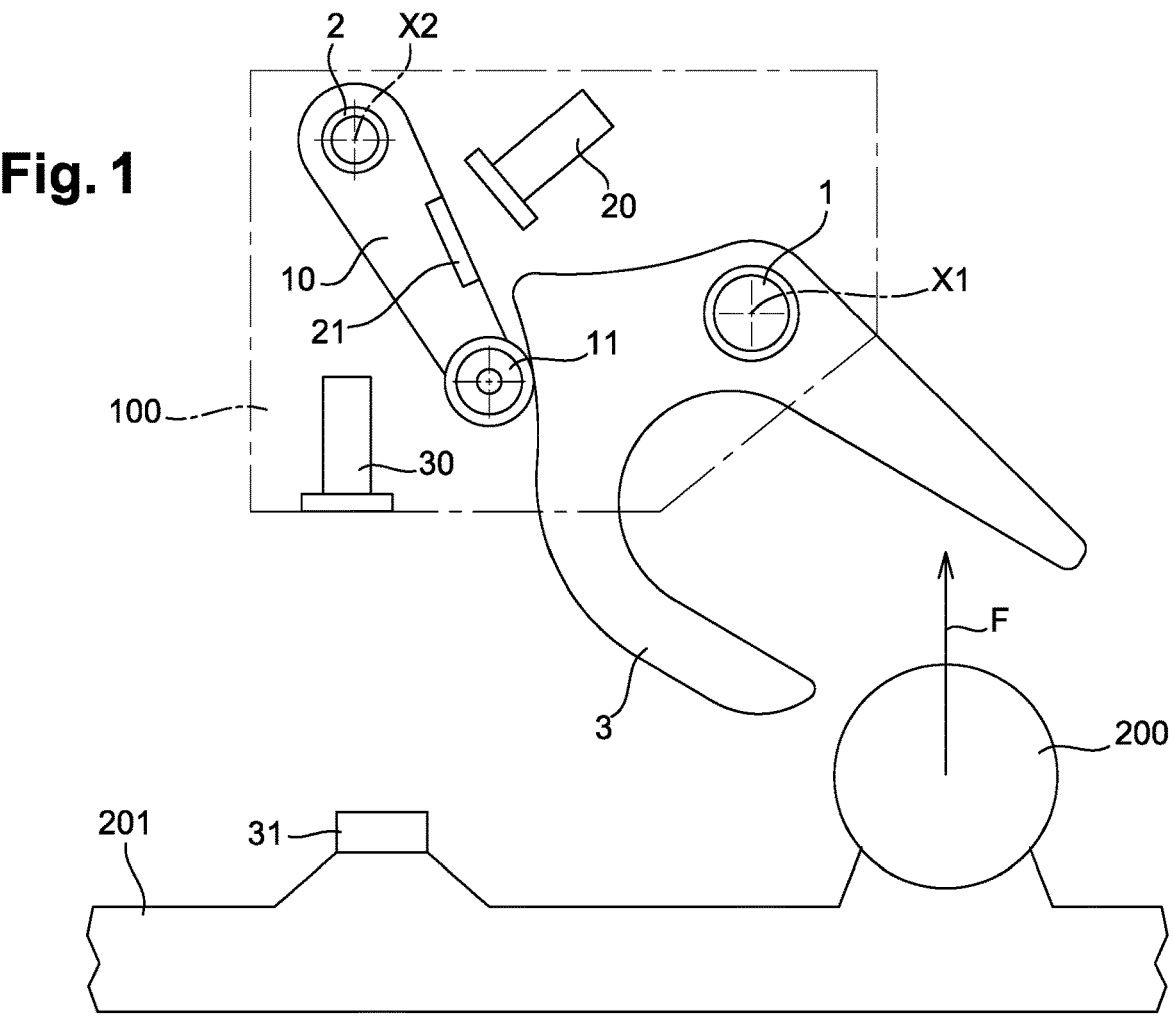
FIG. 1 is a diagrammatic front view of an uplock in accordance with a first particular embodiment of the invention with direct detection, illustrated while the hook is in the release position, the capture pin of the movable element approaching the hook.
Figure 2:
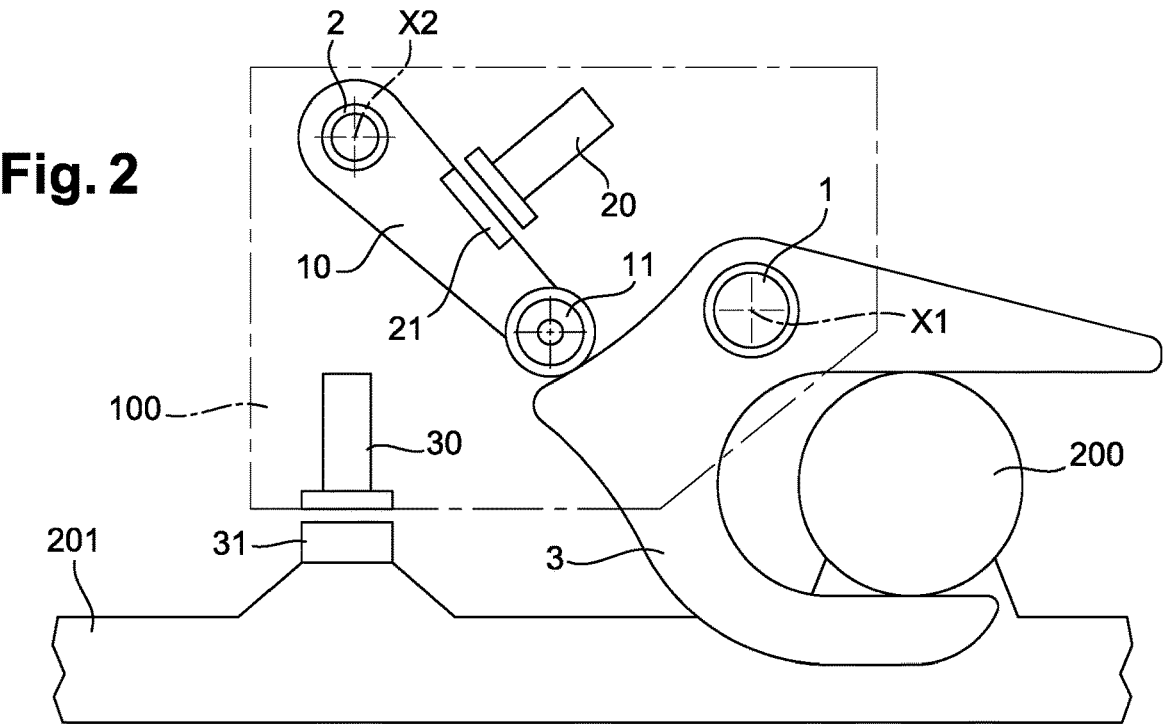
FIG. 2 is a view analogous to that of FIG. 1, illustrating the hook in the locked position while the capture pin is in fact retained by the hook.
Figure 3:
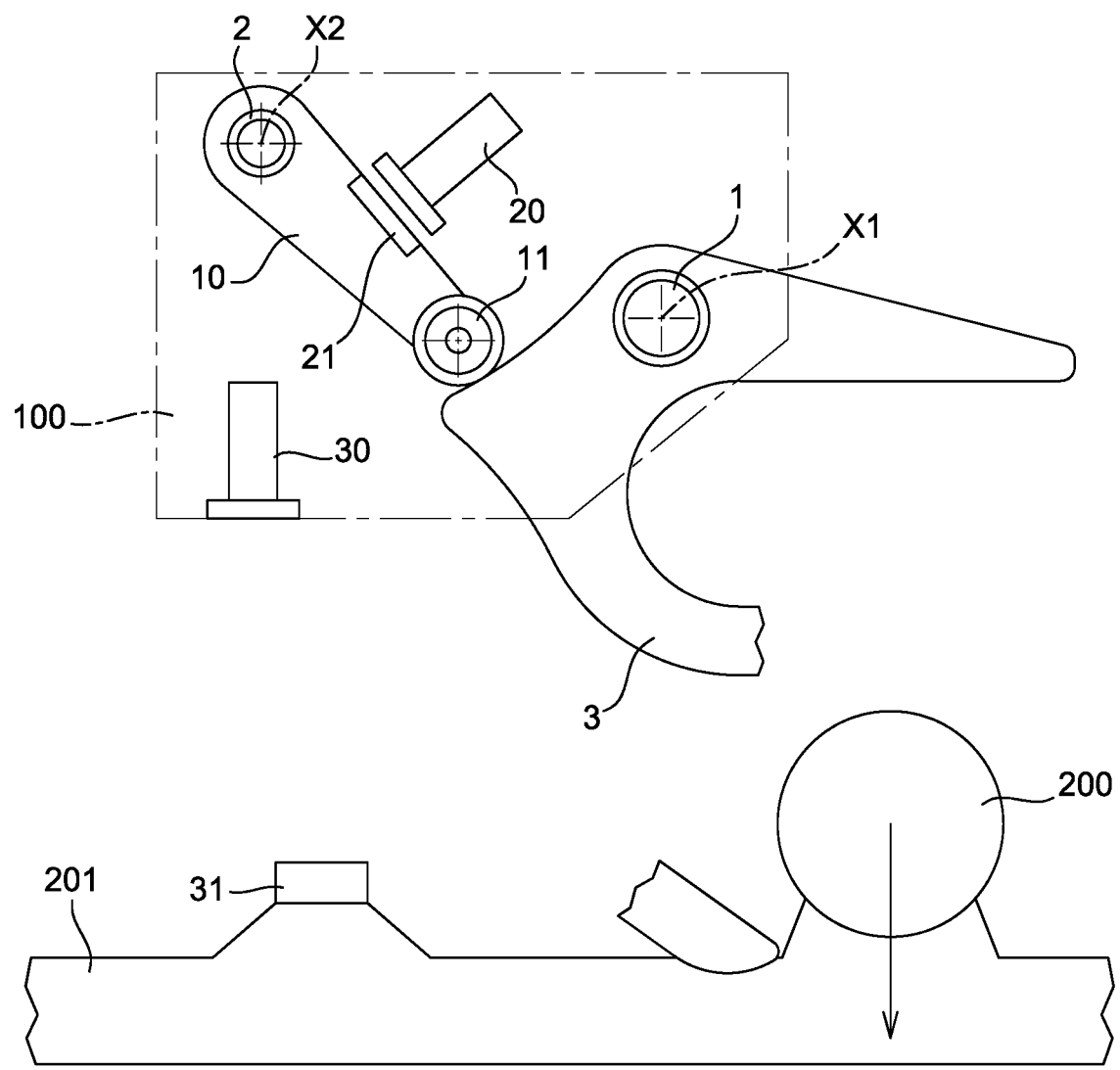
FIG. 3 is a view analogous to that of FIG. 1, illustrating the hook in the locked position while the capture pin has been released from the hook following breakage of a portion thereof.

With reference to FIGS. 1 to 3, and in accordance with a first particular embodiment of the invention, the uplock of the invention comprises a plate 100 carrying a first pivot 1 and a second pivot 2, defining parallel pivot axes X1 and X2. A hook 3 is mounted on the first pivot 1 about the axis X1 so as to pivot between a release position illustrated in FIG. 1, towards which it is urged by a spring (not shown), and a retaining position illustrated in FIGS. 2 and 3. The hook 3 comprises a hooking portion 5 in which a capture pin 200 of a movable element 201 (for example aircraft landing gear or a cargo hold door) is intended to be retained by the uplock in order to immobilize the movable element 201 (for example in the retracted position for the landing gear, or in the closed position for the cargo hold door). To this end, the movable element is displaced by a maneuvering actuator and the capture pin 200 follows the trajectory F, forcing the hook 3 towards the locked position in which it retains the capture pin 200. For this purpose, a locking member 10 is pivotally mounted on the second pivot 2 about the axis X2 and comprises a roller 11 which constantly bears on a cam profile 6 of the hook 3. The locking member 10 pivots between an unlocked position illustrated in FIG. 1 and a locked position illustrated in FIGS. 2 and 3, into which it is returned automatically by a spring (not shown) and which it reaches automatically when the hook 3 arrives in the retaining position. In the locked position, the locking member 10 locks the hook 3 in the retaining position. To release the capture pin 200, an unlocking actuator (not shown) urges the locking member 10 towards the unlocked position, which enables the hook 3 to pivot towards the release position, and therefore enables the capture pin 200 to leave the hook 3.

Here, the uplock is provided with a first proximity sensor 20 which cooperates with a first target 21 carried by the locking member 10 and which is therefore movable between a position which is remote from the first proximity sensor 20, as shown in FIG. 1, and a position proximate to the first proximity sensor, as shown in FIGS. 2 and 3. The signal from the first proximity sensor 20 changes when the associated first target 21 passes from one of the positions to the other, which makes it possible to detect whether the locking member 10 is in the locked position, and therefore the hook is in the retaining position, or whether the locking member 10 is in the unlocked position, and therefore the hook is in the release position. In a variation, the first target 21 can be carried by the hook 3, the first proximity sensor 20 then being securely fixed to the uplock in order to cooperate with the first target carried by the hook 3.

The uplock further comprises a second proximity sensor 30 disposed on the plate 100 in order to cooperate with a second target 31 carried by the movable element 201 in a manner such that the target is movable between a remote position, visible in FIGS. 1 and 3, and a closed position, visible in FIG. 2 in the immediate proximity of the second proximity sensor 30, which corresponds to the position of the movable element 201 that the latter occupies when the capture pin 200 is present in the hook 3. The signal from the second sensor 30 changes when the second target 31 is displaced from one position to the other, which makes it possible to determine whether or not the movable element is occupying the correct position when the capture pin 200 is correctly retained by the hook. The second sensor directly detects the proximity of the movable element 201 to the uplock 100.

The uplock of the invention functions as follows. The initial situation is illustrated in FIG. 1, where the hook 3 is in its release position and the locking member 10 is in its unlocked position. In this position, the first proximity sensor 20 and the first target 21 are spaced apart from each other, and the second proximity sensor 30 and the second target 31 are spaced apart from each other. The movable element 201 is then maneuvered to approach its immobilization position. The capture pin 200 is then displaced in the direction F and urges the hook 3 towards the retaining position. When the hook 3 reaches the retaining position, the locking member 10 automatically moves into its locked position so as to lock the hook 3 in the retaining position. In this position illustrated in FIG. 2, the first proximity sensor 20 and the first target 21 are proximate to each other, so that the signal from the first proximity sensor 20 changes. Similarly, the second proximity sensor 30 and the second target 31 are proximate to each other, so that the signal from the second proximity sensor 30 changes, which makes it possible to determine that the capture pin 200 is in fact present in the hook 3.

It may happen that the hook 3 breaks and no longer retains the capture pin 200. In this situation illustrated in FIG. 3, the movable element 201 has been displaced and the capture pin 200 has left the hook 3 (for example under the effect of gravity) while the latter is still immobilized in the retaining position. In so doing, the second target 31 has moved away from the second proximity sensor 30. The signal from the latter changes, indicating that the capture pin 200 is no longer retained by the hook 3 even though the latter remains immobilized in the retaining position.

The combination of the signals from the two sensors therefore makes it possible to distinguish between four situations:

TABLE 1

| First sensor/ first target | remote | proximate | proximate | remote |
|---|---|---|---|---|
| Second sensor/ second target | remote | proximate | remote | proximate |
| Situation: | FIG. 1 | FIG. 2 | FIG. 3 | Problem locking the hook |

In particular, the combination makes it possible to identify the situation of FIG. 3 in which the hook 3 is referred to as being locked although the movable element 201 is not retained by the hook.

Figure 4:
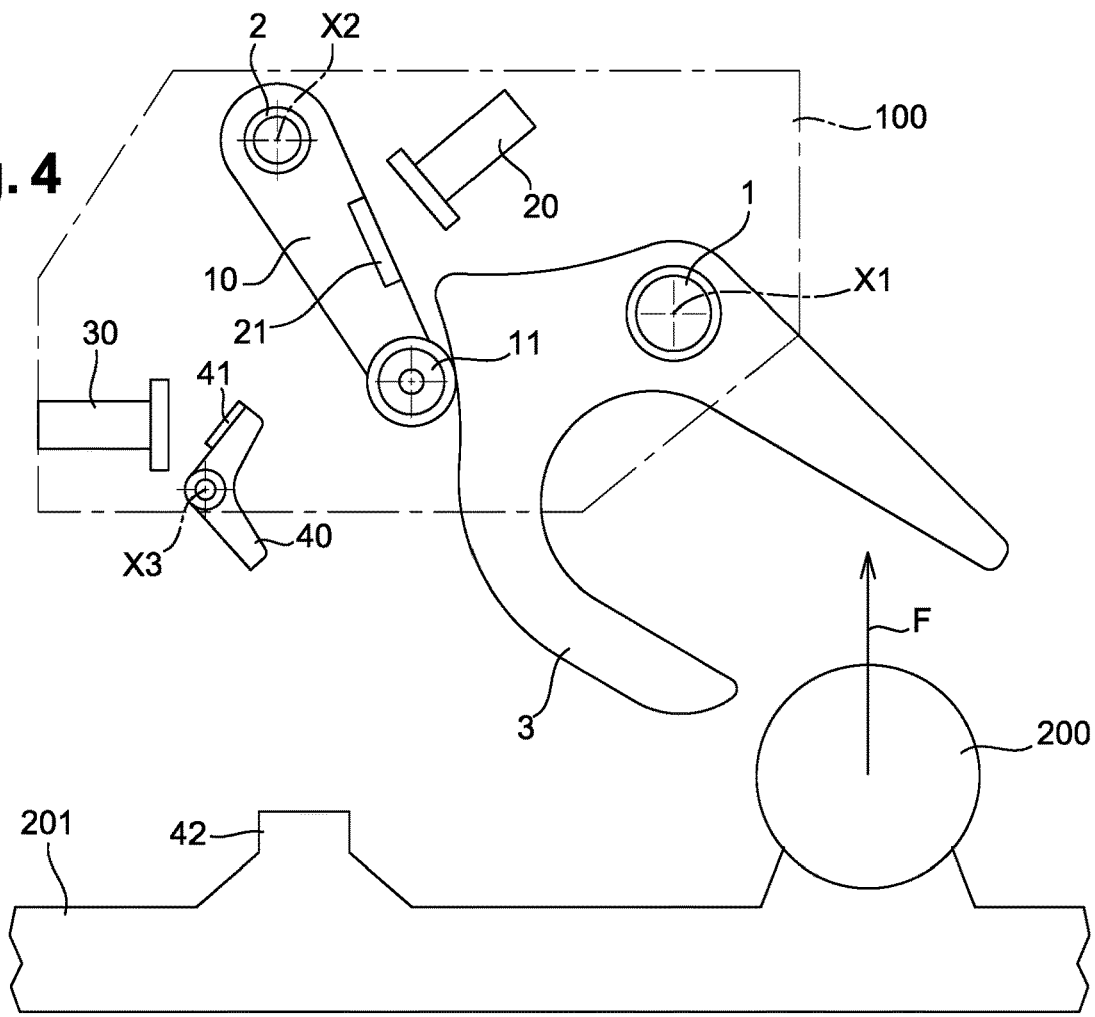
FIG. 4 is a diagrammatic front view of an uplock in accordance with a second particular embodiment of the invention with indirect detection with an indicator lever, illustrated while the hook is in the release position with the capture pin of the movable element approaching the hook.
Figure 5:
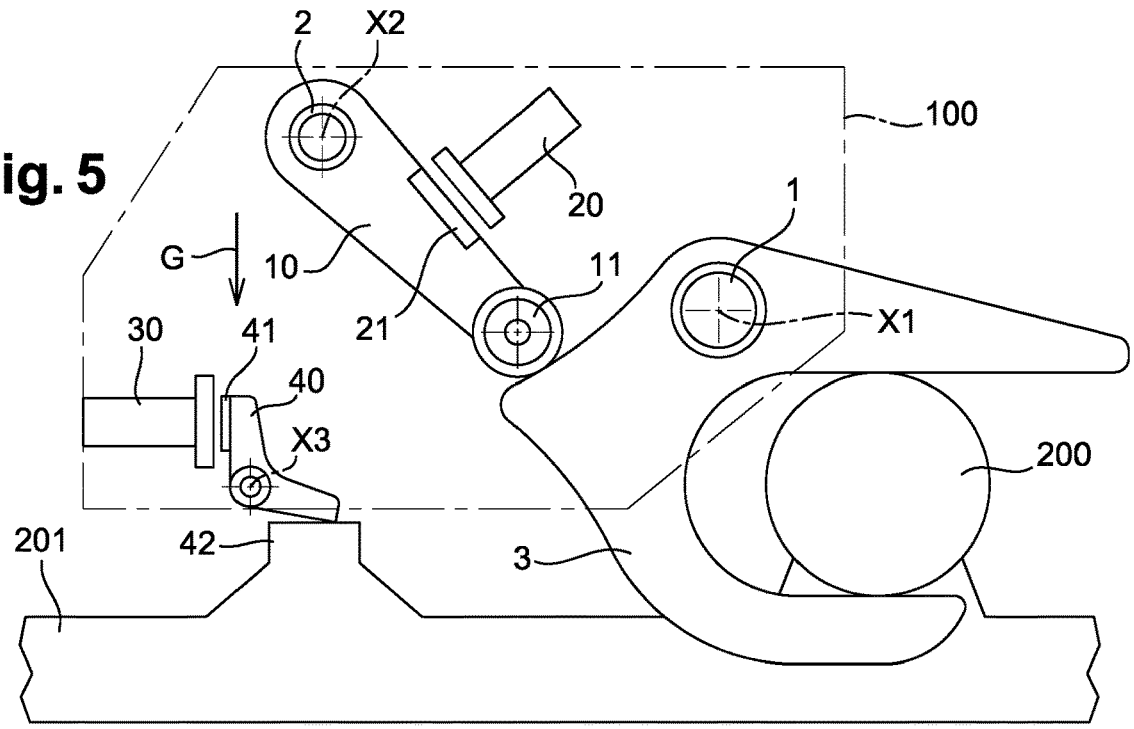
FIG. 5 is a view analogous to that of FIG. 4, illustrating the hook in the locked position while the capture pin is in fact retained by the hook.

In a second particular embodiment shown in FIGS. 4 and 5, the uplock 100 is equipped with an indicator lever 40 which is pivotally mounted on the uplock about an axis X3 which is parallel to the axes X1 and X2. The indicator lever 40 comprises a branch which is intended to be displaced by a pusher 42 of the movable element 201, and a second branch carrying a second target 41 which is intended to cooperate with the second sensor 30. In FIG. 4, when the movable element 201 is remote from the uplock 100, the indicator lever 40 is returned to the illustrated position in which the second target 41 is remote from the second sensor 30. In FIG. 5, the movable element 201 is in the immediate proximity of the uplock 100 and the indicator lever 40 is pushed back by the pusher 42 of the movable element which is distinct from the capture pin 200, so that the second target 41 is brought into a position which is proximate to the second sensor 30. This is an indirect detection of a portion of the movable element (in this case the pusher 42) by means of an indicator lever. The indicator lever 40 does not cooperate with the capture pin 200, but with a portion of the movable element which is distinct, thereby making it easier to install the indicator lever 40. However, as in the previous embodiment, this detection makes it possible to ensure that the capture pin 200 is in fact present in the hook without, however, directly detecting the capture pin 200.

Figure 6:
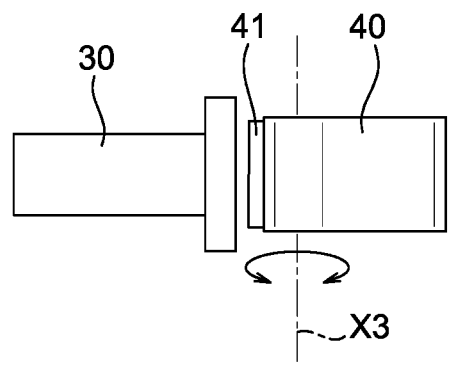
FIG. 6 is a diagrammatic view in the direction of the arrow G of FIG. 5, showing a first possible disposition of the second sensor with respect to the target carried by the indicator lever.
Figure 7:
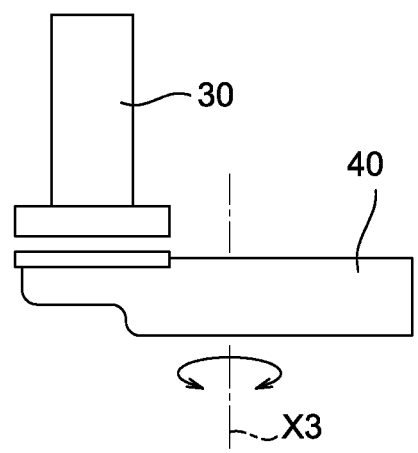
FIG. 7 is a diagrammatic view in the direction of the arrow G of FIG. 5, showing a second possible disposition of the second sensor with respect to the target carried by the indicator lever.

FIG. 6 illustrates the relative disposition of the second sensor 30 and the target 41 in the second embodiment illustrated in FIGS. 4 and 5. It can be seen that the target 41 and the second sensor 30 have a concurrent relative trajectory. In fact, the target 41 is mounted at the end of the indicator lever 40 which pivots about an axis that is parallel to the front surface of the second sensor 30 so that, on the terminal portion of its movement towards the second sensor 30, the target 41 approaches the second sensor 30, following a trajectory which is substantially normal to the front surface of the second sensor 30. This disposition is satisfactory if it is possible to guarantee that, under all circumstances, the movable element 201 will not approach the uplock and run the risk of a collision between the target 41 and the second sensor. If such a risk exists, then it is preferable to use the disposition illustrated in FIG. 7, in which the target 41 and the second sensor 30 have a tangential trajectory, eliminating any risk of collision between these two elements. In fact, the target 41 is then mounted at the end of the indicator lever 40, which pivots about an axis that is normal to the front surface of the second sensor 30 so that, over the terminal portion of its movement towards the second sensor 30, the target 41 approaches the second sensor 30 following a trajectory which is parallel to the front surface of the second sensor 30. Depending on the final position of the movable element 201 relative to the plate 100, the target 41 will be facing the front surface of the second sensor 30 to a greater or lesser extent, but at the same distance from said front surface.

The invention is not limited to the above description, but in contrast encompasses any variation which falls within the scope of the claims.

In particular, although the use of proximity sensors cooperating with a dedicated target has been described herein, it would be possible to use other technologies, such as a microswitch or an optical sensor. Under such circumstances, the target will be the locking member or hook directly for the first sensor, and the movable element itself or the indicator lever for the second sensor.

The sensors are preferably mounted on fixed portions, but at least one of them may be mounted on a movable portion.

The invention claimed is:

1. An uplock for selectively retaining a capture pin of a movable element, the uplock comprising:
    a hook which is movable between a release position and a position for retaining a capture pin of the movable element;
    a lock interacting with the hook and movable between a locked position in which the lock immobilizes the hook in the retaining position and an unlocked position in which the hook is free to be displaced under the force of the capture pin of the movable element;
    detection means adapted to detect a situation in which the hook is in the retaining position and whether the capture pin is present in the hook, wherein the detection means comprise a first sensor which senses a target on the lock in order to detect whether the hook is in the retaining position, and a second sensor which is disposed to sense a target on a portion of the movable element which is distinct from the capture pin in order to detect the presence of the movable element in the immediate proximity of the uplock in the position occupied by the movable element when the capture pin is present in the hook.

2. The uplock as claimed in claim 1, in which the second sensor is adapted to directly sense the target on a portion of the movable element in order to detect the presence of the movable element in the immediate proximity of the uplock in the position occupied by the movable element when the capture pin is present in the hook.

3. The uplock as claimed in claim 2, in which the second sensor is a proximity sensor, with the portion of the movable element that is sensed by the second sensor forming the target.

4. The uplock as claimed in claim 1, in which the second sensor indirectly senses the portion of the movable element via an indicator lever which is movably mounted on the uplock, the portion of the movable element displacing the lever between a position in which the indicator lever is proximate to the second sensor and a position in which the indicator lever is remote from the second sensor, one of said positions corresponding to the presence of the movable element in the immediate proximity of the uplock in the position occupied by the movable element when the capture pin is present in the hook.

5. The uplock as claimed in claim 4, in which the second sensor is a proximity sensor which senses a portion of the indicator lever forming the target for the second sensor.

6. The uplock as claimed in claim 5, in which the second sensor and the target are mounted relative to each other so as to have a concurrent relative trajectory.

7. The uplock as claimed in claim 5, in which the target is mounted on an indicator lever so as to follow a trajectory which is parallel to a front surface of the second sensor such that the second sensor and the target have a tangential relative trajectory.

8. The uplock as claimed in claim 1, in which at least one of the sensors is a proximity sensor.

9. The uplock as claimed in claim 1, in which at least one of the sensors is mounted on a fixed portion.

10. A landing gear assembly comprising a movable element which is movable between a lowered position and a raised position in which a capture pin that is integral with the movable element is received in the hook of the uplock as claimed in claim 1, the second sensor being positioned so as to extend in the proximity of a portion which is integral with the movable element and distinct from the capture pin in order to detect the presence of the movable element in the immediate proximity of the uplock.

11. The landing gear assembly as claimed in claim 10, in which the movable element is a landing gear.

12. The landing gear assembly as claimed in claim 10, in which the movable element is a cargo hold door.

13. An uplock for selectively retaining a capture pin of a movable element, the uplock comprising:
a hook which is movable between a release position and a position for retaining a capture pin of the movable element;
a lock interacting with the hook and movable between a locked position in which the lock immobilizes the hook in the retaining position and an unlocked position in which the hook is free to be displaced under the force of the capture pin of the movable element;
a first sensor which senses a target on the lock in order to detect whether the hook is in the retaining position;
a second sensor which is disposed to sense a target on a portion of the movable element which is distinct from the capture pin in order to detect the presence of the movable element in the immediate proximity of the uplock in the position occupied by the movable element when the capture pin is present in the hook.

14. The uplock as claimed in claim 13, in which the second sensor is adapted to directly sense a target on a portion of the movable element in order to detect the presence of the movable element in the immediate proximity of the uplock in the position occupied by the movable element when the capture pin is present in the hook.

15. The uplock as claimed in claim 14, in which the second sensor is a proximity sensor, with the portion of the movable element that is sensed by the second sensor forming the target.

16. The uplock as claimed in claim 13, in which the second sensor indirectly senses the portion of the movable element via an indicator lever which is movably mounted on the uplock, the portion of the movable element displacing the lever between a position in which the indicator lever is proximate to the second sensor and a position in which the indicator lever is remote from the second sensor, one of said positions corresponding to the presence of the movable element in the immediate proximity of the uplock in the position occupied by the movable element when the capture pin is present in the hook.

17. The uplock as claimed in claim 16, in which the second sensor is a proximity sensor which senses a portion of the indicator lever forming the target for the second sensor.

18. The uplock as claimed in claim 17, in which the second sensor and the target are mounted relative to each other so as to have a concurrent relative trajectory.

19. The uplock as claimed in claim 17, in which the target is mounted on an indicator lever so as to follow a trajectory which is parallel to a front surface of the second sensor such that the second sensor and the target have a tangential relative trajectory.

20. The uplock as claimed in claim 13, in which at least one of the first sensor or the second sensor is a proximity sensor.

* * * * *